(12) United States Patent
Ono et al.

(10) Patent No.: US 11,441,488 B2
(45) Date of Patent: Sep. 13, 2022

(54) GAS TURBINE POWER GENERATION SYSTEM

(71) Applicant: TOSHIBA ENERGY SYSTEMS & SOLUTIONS CORPORATION, Kawasaki (JP)

(72) Inventors: Takahiro Ono, Ota Tokyo (JP); Tsuguhisa Tashima, Yokohama Kanagawa (JP); Shogo Iwai, Ota Tokyo (JP); Hideyuki Maeda, Yokohama Kanagawa (JP); Tomomi Okuyama, Ota Tokyo (JP); Koki Nishimura, Kawasaki Kanagawa (JP)

(73) Assignee: TOSHIBA ENERGY SYSTEMS & SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/142,423

(22) Filed: Jan. 6, 2021

(65) Prior Publication Data

US 2021/0215102 A1 Jul. 15, 2021

(30) Foreign Application Priority Data

Jan. 10, 2020 (JP) .............................. JP2020-002672

(51) Int. Cl.
*F02C 7/36* (2006.01)
*F02C 7/06* (2006.01)

(52) U.S. Cl.
CPC ................. *F02C 7/36* (2013.01); *F02C 7/06* (2013.01); *F05D 2240/52* (2013.01); *F05D 2260/4023* (2013.01); *F05D 2260/4031* (2013.01)

(58) Field of Classification Search
CPC .......... F02C 7/36; F02C 7/06; F05D 2240/52; F05D 2260/4023; F05D 2260/4031; F05D 2220/76; F05D 2260/40; F05D 2260/611; F01D 5/026; F01D 5/10; F01D 15/08; F01D 25/168; F01D 15/10
See application file for complete search history.

(56) References Cited

U.S. PATENT DOCUMENTS

| 5,964,663 A * | 10/1999 | Stewart ..................... F01D 5/02 415/216.1 |
| 2006/0197345 A1* | 9/2006 | Kuroki ..................... F16D 27/04 290/1 A |
| 2018/0142741 A1* | 5/2018 | Sethi ........................ F01D 15/10 |

FOREIGN PATENT DOCUMENTS

| CN | 205260375 U | 5/2016 |
| CN | 110145475 A | 8/2019 |
| EP | 1 288 514 A2 | 3/2003 |
| JP | S59-081532 A | 5/1984 |
| JP | H03-009002 A | 1/1991 |
| JP | H10-159586 A | 6/1998 |

* cited by examiner

*Primary Examiner* — Jacob M Amick
*Assistant Examiner* — Charles J Brauch
(74) *Attorney, Agent, or Firm* — Foley & Lardner LLP

(57) ABSTRACT

Shaft stability is enhanced and reliability is improved. In a gas turbine power generation system of an embodiment, a pressurizing unit, a rotation control unit, a diaphragm coupling, a turbine, and a generator are disposed to line up sequentially on the same shaft. A thrust bearing is provided between the turbine and the generator. The turbine is configured such that a working medium flows from the diaphragm coupling side toward the rotation control unit side.

3 Claims, 3 Drawing Sheets

ગેસ TURBINE POWER GENERATION SYSTEM

CROSSREFERENCE TO RELATED APPLICATIONS

This application is based upon and claims the benefit of priority from Japanese Patent Application (JP No. 2020-002672), filed on Jan. 10, 2020; the entire contents of which are incorporated herein by reference.

FIELD

Embodiments of the present invention relate to a gas turbine power generation system.

BACKGROUND

In a single-shaft type gas turbine power generation system in which a pressurizing unit such as a compressor, and, a generator are installed on the same shaft as that of a turbine, a technique of interposing a rotation control unit such as a clutch between the turbine and the pressurizing unit is proposed.

FIG. 2 is a diagram schematically illustrating an example of a gas turbine power generation system according to the related art.

As illustrated in FIG. 2, the gas turbine power generation system according to the related art is a single-shaft type, and a pressurizing unit 10, a rotation control unit 20, a turbine 30, and a generator 40 are disposed to line up sequentially on the same shaft. The pressurizing unit 10 is constituted of a pump, a compressor, and the like. The rotation control unit 20 is constituted of a clutch, a fluid coupling, a speed reducer, and the like, and configured to control a rotational motion to transmit from the turbine 30 to the pressurizing unit 10.

In the gas turbine power generation system, the respective rotating shafts of the pressurizing unit 10, the rotation control unit 20, the turbine 30, and the generator 40 are supported to be freely rotated by using radial bearings 50. Further, in the gas turbine power generation system, as a starting point of thermal elongation, a thrust bearing 70 is provided. In general, since an upstream side into which a working medium flows (the left side in FIG. 2) is higher in temperature and larger in thermal elongation amount than a downstream side in the rotating shaft of the turbine 30, the thrust bearing 70 is installed on the upstream side of the turbine 30.

In order to absorb a thermal elongation amount due to thermal expansion and thermal contraction in an axial direction of the turbine 30, the rotating shaft of the rotation control unit 20 and the rotating shaft of the turbine 30 are considered to be coupled therebetween by a diaphragm coupling 60.

FIG. 3 is a sectional view schematically illustrating an example of the diaphragm coupling 60 according to the related art.

As illustrated in FIG. 3, in the diaphragm coupling 60, a pair of flanges 61a, 61b are provided so as to sandwich a center tube 62. Then, a diaphragm 63a is interposed between the flange 61a and the center tube 62, and a diaphragm 63b is interposed between the other flange 61b and the center tube 62. The flange 61a is coupled to the rotating shaft of the rotation control unit 20, for example, and the flange 61b is coupled to the rotating shaft of the turbine 30, for example.

In the diaphragm coupling 60, the diaphragms 63a, 63b are composed of sheet metal, and have high torsional stiffness for the purpose of transmission of rotational torque and are formed in a deformable shape against bending, compression, and the like. This allows the diaphragm coupling 60 to transmit the rotational torque accurately and absorb a positional deviation of the rotating shaft caused by the thermal elongation or the like owing to elastic deformation of the diaphragms 63a, 63b. Specifically, the diaphragm coupling 60 is configured to be in a compression state or in a tensile state in an axial direction. Further, the diaphragm coupling 60 is configured such that a shaft of the flange 61a and a shaft of the other flange 61b are not in a coaxial state but in a state of moving in parallel or in a state of being inclined. Note that the diaphragm coupling 60 is also referred to as a flexible coupling in some cases.

As described above, since the diaphragm coupling 60 has a flexible structure, considering shaft stability, a coupling end portion exhibits a behavior close to a state of cutting a shaft end on the rotation control unit 20 side and an edge therebetween (refer to FIG. 2). That is, the shaft end is sometimes greatly vibrated similarly to a case of a state where the shaft is not coupled.

Further, a span between the bearings is one of the most important factors in a study of the shaft stability, and a case where an overhang portion at the shaft end is long sometimes causes unstable vibration due to whirling of the shaft end. In order to avoid this, the overhang portion at the shaft end is preferably shorter.

However, in the related art, in a case in FIG. 2, from the turbine 30 toward a side of the rotation control unit 20, the radial bearing 50, the thrust bearing 70, and the diaphragm coupling 60 are disposed. That is, on an overhang portion between a shaft end of the radial bearing 50 and the diaphragm coupling 60 shaft end, the thrust bearing 70 is interposed. For this reason, in the case in FIG. 2, a length L of the overhang portion between the shaft end of the radial bearing 50 and the shaft end of the diaphragm coupling 60 is long. As a result, on the diaphragm coupling 60 side in the rotating shaft of the turbine 30 (the left side in FIG. 2), the shaft stability is low and an improvement in reliability is not easy.

The problem to be solved by the present invention is to provide a gas turbine power generation system which enhances shaft stability and is capable of improving reliability.

DETAILED DESCRIPTION

In a gas turbine power generation system of an embodiment, a pressurizing unit, a rotation control unit, a diaphragm coupling, a turbine, and a generator are disposed to line up sequentially on the same shaft. Between the turbine and the generator, a thrust bearing is provided. The turbine is configured such that a working medium flows from the diaphragm coupling side toward the rotation control unit side.

The gas turbine power generation system according to the embodiment will be described using FIG. 1.

Figure 1:
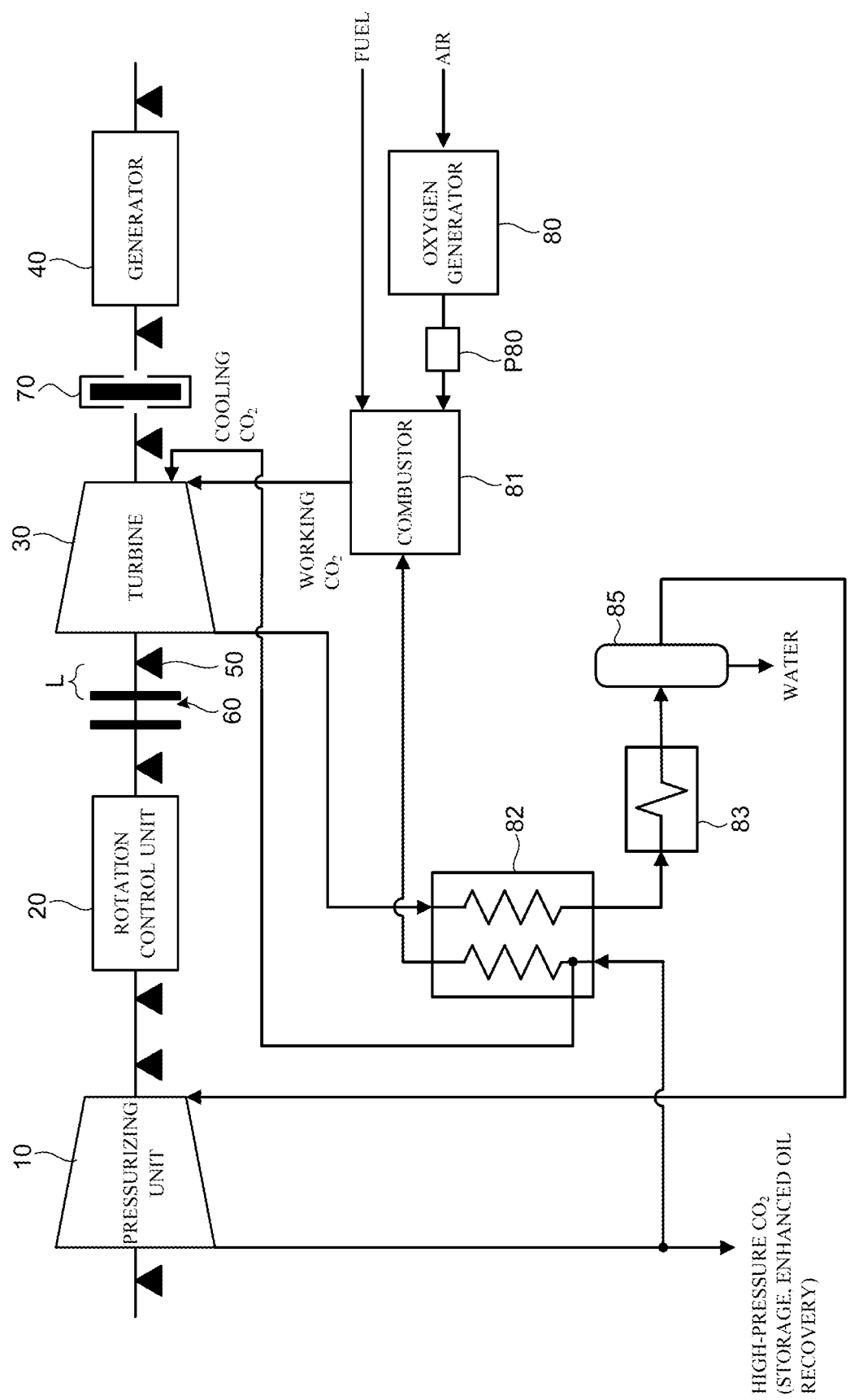
FIG. 1 is a diagram schematically illustrating a gas turbine power generation system according to an embodiment.

As illustrated in FIG. 1, the gas turbine power generation system of this embodiment includes a pressurizing unit 10, a rotation control unit 20, a turbine 30, a generator 40, radial bearings 50 a diaphragm coupling 60, a thrust bearing 70, an oxygen generator 80, a combustor 81, a regenerative heat exchanger 82, a cooler 83, and a humidity separator 85. In the gas turbine power generation system of this embodiment, the respective parts are provided to constitute a semi-close cycle using a supercritical $CO_2$ medium.

Specifically, in the turbine 30, a supercritical medium (working $CO_2$) overheated by combustion of the combustor 81 is supplied as a working medium. In the turbine 30, the working medium expands to work, thereby rotating a rotating shaft of the turbine 30 and driving the generator 40 to generate electricity.

In the regenerative heat exchanger 82, a heat exchange between the medium exhausted from the turbine 30 and a medium discharged from the pressurizing unit 10 is performed. Here, by the heat exchange in the regenerative heat exchanger 82, the medium exhausted from the turbine 30 is cooled. On the other hand, by the heat exchange in the regenerative heat exchanger 82, the medium discharged from the pressurizing unit 10 is heated to be supplied to the combustor 81.

The cooler 83 cools the medium subjected to the heat exchange in the regenerative heat exchanger 82 after being exhausted from the turbine 30. This causes water vapor contained in the medium discharged from the regenerative heat exchanger 82 to be condensed in the cooler 83.

The humidity separator 85 is supplied with the medium discharged from the cooler 83. The humidity separator 85 separates water produced by the condensation in the cooler 83 (liquid phase water) from the supplied medium. The separated water is discharged from the humidity separator 85 to the outside. For this reason, a medium containing high-purity $CO_2$ can be obtained in the humidity separator 85.

The pressurizing unit 10 is a $CO_2$ pump, is supplied with the medium being high-purity $CO_2$ from the humidity separator 85, and pressurizes the supplied medium to a supercritical pressure. A part of the medium pressurized by the pressurizing unit 10 is discharged to the outside, and utilized for, for example, storage, enhanced oil recovery, and the like. Here, for example, $CO_2$ corresponding to an amount of $CO_2$ increased by combustion in the combustor 81 is discharged to the outside. Then, the remainder of the medium pressurized by the pressurizing unit 10 is supplied to the regenerative heat exchanger 82 to be heated therein as described above.

A partial medium extracted from the middle of the regenerative heat exchanger 82 is supplied to the turbine 30 as a cooling medium (cooling $CO_2$). The remainder of the medium passing through the regenerative heat exchanger 82 is led to the combustor 81 as described above. Further, to the combustor 81, oxygen generated from air by the oxygen generator 80 is compressed using an oxygen compressor P80 to be supplied, and a fuel such as natural gas is supplied. In the combustor 81, the fuel and the oxygen react to each other to cause the combustion.

Figure 2:
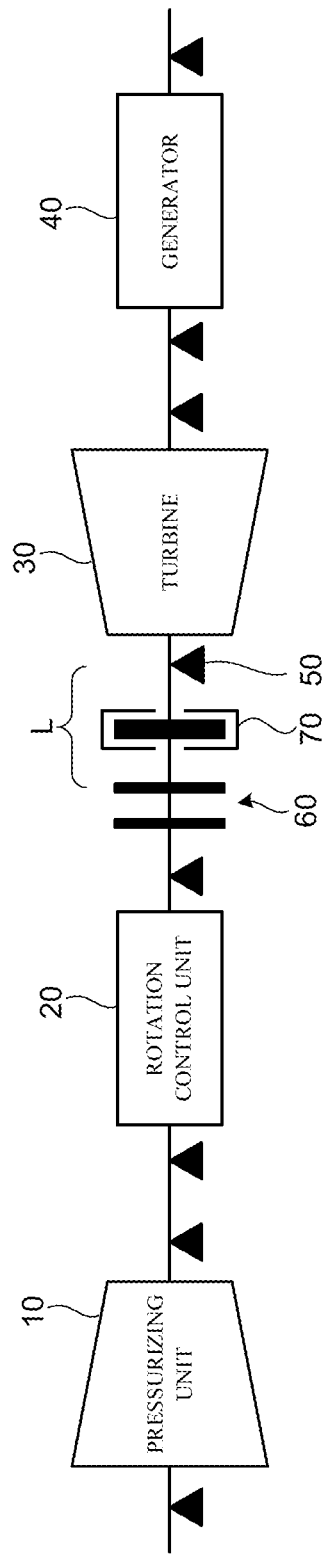
FIG. 2 is a diagram schematically illustrating an example of a gas turbine power generation system according to a related art.
Figure 3:
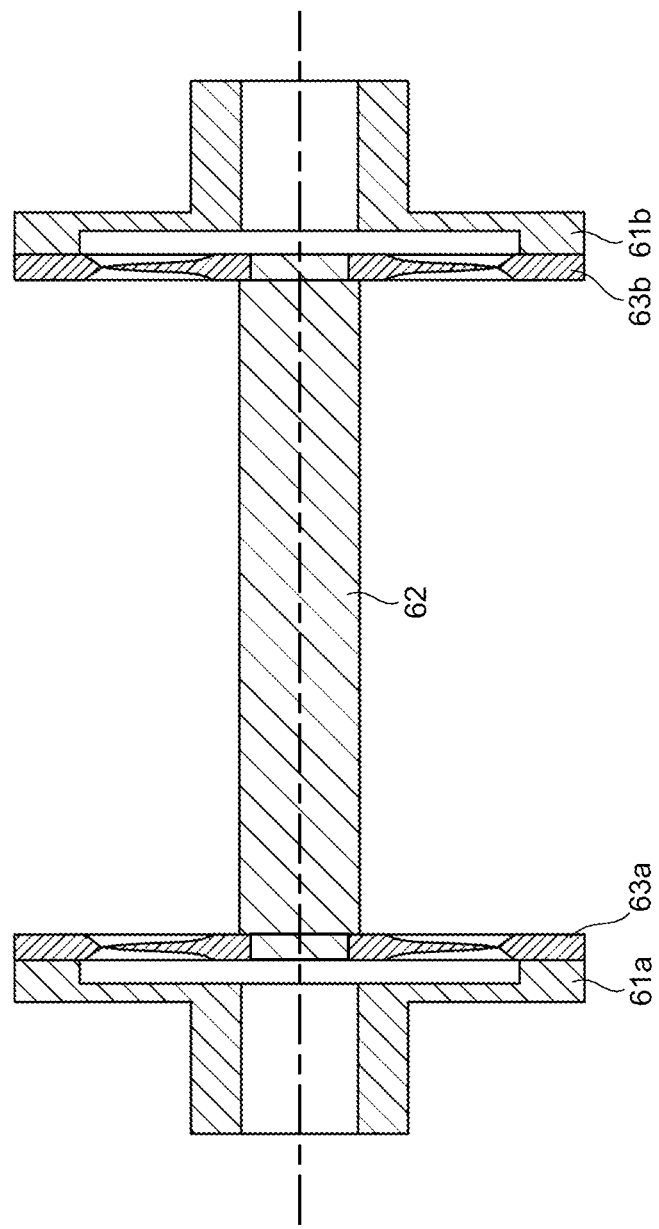
FIG. 3 is a sectional view schematically illustrating an example of a diaphragm coupling 60 according to the related art.

The gas turbine power generation system of this embodiment is a single-shaft type, and the pressurizing unit 10, the rotation control unit 20, the turbine 30, and the generator 40 are disposed to line up sequentially on the same shaft, similarly to a case of the related art (refer to FIG. 2). Further, the respective rotating shafts of the pressurizing unit 10, the rotation control unit 20, the turbine 30, and the generator 40 are supported to be freely rotated by using radial bearings 50. The rotation control unit 20 includes a clutch and a speed reducer, and is configured to control a rotational motion to transmit from the turbine 30 to the pressurizing unit 10.

In order to absorb a thermal elongation amount due to thermal expansion and thermal contraction in an axial direction of the turbine 30, the rotating shaft of the rotation control unit 20 and the rotating shaft of the turbine 30 are coupled therebetween using a diaphragm coupling 60. The rotating shaft of the pressurizing unit 10 and the rotating shaft of the rotation control unit 20, and, the rotating shaft of the turbine 30 and the rotating shaft of the generator 40 are each coupled directly therebetween using, for example, a fastening member such as a bolt though the illustration is omitted. That is, the coupling between the rotating shaft of the rotation control unit 20 and the rotating shaft of the turbine 30 has a flexible structure, while the other couplings each have a rigid structure.

Further, as a starting point of thermal elongation, the thrust bearing 70 is provided. However, in this embodiment, differently from the case of the related art, the turbine 30 is an axial flow turbine in which a working medium flows from the generator 40 side toward the rotation control unit 20 side, and the thrust bearing 70 is installed on an upstream side having a large thermal elongation amount in the turbine 30 (the right side in FIG. 1).

As described above, the gas turbine power generation system of this embodiment includes a power train in which the pressurizing unit 10, the rotation control unit 20, the diaphragm coupling 60, the turbine 30, and the generator 40 are disposed sequentially on the same shaft. In this embodiment, differently from the case of the related art, between the turbine 30 and the diaphragm coupling 60, the thrust bearing 70 is not interposed. In this embodiment, the thrust bearing 70 is interposed between the turbine 30 and the generator 40. In this embodiment, this allows a length L of an overhang portion between a shaft end of the radial bearing 50 and a shaft end of the diaphragm coupling 60 to be made shorter than that in the case of the related art. As a result, in this embodiment, on the diaphragm coupling 60 side of the turbine 30 (the left side in FIG. 1), since the shaft stability can be enhanced, reliability can be improved.

Incidentally, on the generator 40 side of the turbine 30 (the right side in FIG. 1), a shaft length becomes long, but the coupling between the rotating shaft of the turbine 30 and the rotating shaft of the generator 40 has the rigid structure as described above, and a Q value of a vibration mode in which the shaft end is vibrated rises slightly, which falls within a range of not affecting the shaft stability and does not have a problem.

In the above-described embodiment, there is described a case where the pressurizing unit 10 installed on the same shaft as that of the turbine 30 is the $CO_2$ pump which is supplied with the medium being high-purity $CO_2$ from the humidity separator 85 and pressurizes the medium to a supercritical pressure, but this is not restrictive. The pressurizing unit 10 is not a pump such as the $CO_2$ pump, and for example, in a case of being constituted as a compressor such as the above-described oxygen compressor P80, the similar effect can also be demonstrated.

Further, in the above-described embodiment, there is described a case where the rotation control unit 20 includes the clutch and the speed reducer, but this is not restrictive. The rotation control unit 20 need not include the speed reducer.

Several embodiments of the present invention have been explained, but these embodiments have been presented by way of example only, and are not intended to limit the scope of the invention. These novel embodiments can be embodied in a variety of other forms, and various omissions, substitutions and changes may be made without departing from the spirit of the inventions. These embodiments and their modifications are included in the scope and gist of the invention and are included in the invention described in claims and their equivalents.

REFERENCE SIGNS LIST

10 . . . pressurizing unit, 20 . . . rotation control unit, 30 . . . turbine, 40 . . . generator, 50 . . . radial bearing, 60 . . . diaphragm coupling, 61a . . . flange, 61b . . . flange, 62 . . . center tube, 63a . . . diaphragm, 63b . . . diaphragm, 70 . . . thrust bearing, 80 . . . oxygen generator, 81 . . . combustor, 82 . . . regenerative heat exchanger, 83 . . . cooler, 85 . . . humidity separator, P80 . . . oxygen compressor

What is claimed is:

1. A gas turbine power generation system in which a pressurizing unit, a rotation control unit, a diaphragm coupling, a radial bearing, a turbine, and a generator are disposed to line up sequentially on a same shaft, the gas turbine power generation system comprising
a thrust bearing provided between the turbine and the generator, wherein
the turbine is configured such that a working medium flows from the diaphragm coupling side toward the rotation control unit side.

2. The gas turbine power generation system according to claim 1, wherein
the rotation control unit has a clutch.

3. The gas turbine power generation system according to claim 2, wherein
the rotation control unit further has a speed reducer.

* * * * *